(12) United States Patent
Kim

(10) Patent No.: US 8,455,124 B2
(45) Date of Patent: Jun. 4, 2013

(54) SECONDARY BATTERY AND METHOD OF FABRICATING THE SAME

(75) Inventor: Dae-Kyu Kim, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 178 days.

(21) Appl. No.: 12/870,352

(22) Filed: Aug. 27, 2010

(65) Prior Publication Data

US 2011/0076549 A1 Mar. 31, 2011

(30) Foreign Application Priority Data

Sep. 30, 2009 (KR) .................. 10-2009-0093223

(51) Int. Cl.
*H01M 2/18* (2006.01)

(52) U.S. Cl.
USPC ........................................... 429/94; 429/129

(58) Field of Classification Search
USPC .................................................. 429/94, 129
See application file for complete search history.

(56) References Cited

U.S. PATENT DOCUMENTS

| | | | |
|---|---|---|---|
| 6,040,085 A | 3/2000 | Cheu et al. | |
| 7,063,916 B2 * | 6/2006 | Ugawa et al. | 429/94 X |
| 7,482,090 B2 | 1/2009 | Tatebayashi et al. | |
| 7,709,141 B2 | 5/2010 | Kim et al. | |
| 7,722,983 B2 | 5/2010 | Kim et al. | |
| 7,807,283 B2 | 10/2010 | Tatebayashi et al. | |
| 7,960,048 B2 | 6/2011 | Jang et al. | |
| 2006/0154138 A1 | 7/2006 | Miyamoto et al. | |
| 2008/0233474 A1 | 9/2008 | Son et al. | |
| 2009/0241768 A1 | 10/2009 | Ogiwara et al. | |
| 2009/0297930 A1 | 12/2009 | Koshikawa | |

FOREIGN PATENT DOCUMENTS

| | | |
|---|---|---|
| CN | 1805204 A | 7/2006 |
| CN | 1855603 A | 11/2006 |
| CN | 101350433 A | 1/2009 |
| EP | 1710858 A1 | 10/2006 |
| EP | 2017908 A1 | 1/2009 |
| EP | 2254187 A1 | 11/2010 |
| EP | 2273599 A1 | 1/2011 |
| JP | 62278771 A | 12/1987 |
| JP | 04184871 A | 7/1992 |
| JP | 9-302109 A | 11/1997 |
| JP | 2003-243036 A | 8/2003 |

(Continued)

OTHER PUBLICATIONS

European Office Action issued by European Patent Office on Mar. 15, 2012 in connection with European Patent Application No. 10175380. 4, which also claims Korean Patent Application Serial No. 10-2009-0093223 as its priority document.

(Continued)

*Primary Examiner* — Stephen J. Kalafut
(74) *Attorney, Agent, or Firm* — Robert E. Bushnell

(57) ABSTRACT

A secondary battery and a method of fabricating the same. The secondary battery includes an electrode assembly including a positive electrode plate, a negative electrode plate, and a separator interposed therebetween, a sealing tape surrounding a circumferential surface of the electrode assembly, a can housing the electrode assembly, and a cap assembly sealing the can. The sealing tape is formed of a heat-shrinkable material. The can is heated at a predetermined after the electrode assembly and the sealing tape are sealed in the can, to shrink the sealing tape.

16 Claims, 4 Drawing Sheets

FOREIGN PATENT DOCUMENTS

| | | |
|---|---|---|
| JP | 2004-253330 A | 9/2004 |
| JP | 2006-196276 A | 7/2006 |
| JP | 2007-184238 A | 7/2007 |
| JP | 2009-199974 A | 9/2009 |
| KR | 1020010038477 A | 5/2001 |
| KR | 1020060010487 A | 2/2006 |
| KR | 1020060044822 A | 5/2006 |
| KR | 100719725 B1 | 5/2007 |
| KR | 10-2007-0072451 A | 7/2007 |
| KR | 1020080035226 A | 4/2008 |

OTHER PUBLICATIONS

European Search Report dated Jan. 12, 2011, corresponding to European Patent Application No. 10175380.4.

Korean Notice of Allowance issued on Dec. 29, 2011 in connection with Korean Patent Application Serial No. 10-2009-0093223 and Request for Entry of the Accompanying Office Action attached herewith.

Korean Office Action issued on Apr. 22, 2011 in corresponding Korean Patent Application No. 10-2009-0093223.

Japanese Office action issued by Japanese Patent Office on Sep. 25, 2012, in connection with Japanese Patent Application No. 2010-033588 and Request for Entry attached herewith.

European Office action issued by European Patent Office on Sep. 19, 2012, in connection with European Patent Application No. 10175380.4 is attached herewith.

Chinese Office Action issued by Chinese Patent Office on Dec. 26, 2012 corresponding to Chinese Patent Application No. 201010299097.2. (English translation attached).

\* cited by examiner

SECONDARY BATTERY AND METHOD OF FABRICATING THE SAME

CLAIM OF PRIORITY

This application makes reference to, incorporates into this specification the entire contents of, and claims all benefits accruing under 35 U.S.C. §119 from an application earlier filed in the Korean Intellectual Property Office on Sep. 30, 2009, and there duly assigned Serial No. 10-2009-0093223.

BACKGROUND OF THE INVENTION

1. Field of the Invention

The present invention relates to a secondary battery and a method of fabricating the same, and more particularly, to a secondary battery and a method of fabricating the same, in which an electrode assembly is close to a can, thereby preventing a short circuit between the electrode assembly and a cap assembly due to an external impact such as the secondary battery being dropped.

2. Description of the Related Art

In recent times, various compact handheld electronic/electrical devices such as cellular phones, notebook computers, camcorders, and so on, have been widely developed and produced. The handheld electronic/electrical devices include a battery pack to be operated without a separate power source. The battery packs may be classified into a nickel-cadmium (Ni—Cd) battery, a nickel-metal hydride (Ni-MH) battery, and a lithium (Li) battery. The battery pack using a secondary (rechargeable) battery is generally used in consideration of economic efficiency.

SUMMARY OF THE INVENTION

It is therefore an aspect of the present invention to provide an improved secondary battery and an improved method of fabricating the same.

It is another aspect of the present invention to provide a secondary battery and a method of fabricating the same, in which an electrode assembly is inserted into a can to be close thereto. Thus, the electrode assembly can be inserted into the can without damage, and the movement or revolution of the electrode assembly due to an external impact such as being dropped can be prevented.

According to one aspect of the present invention, a secondary battery may be constructed with an electrode assembly including a positive electrode plate, a negative electrode plate, and a separator interposed therebetween, a sealing tape surrounding a circumferential surface of the electrode assembly, a can housing the electrode assembly, and a cap assembly sealing the can. Here, the sealing tape is formed of a heat-shrinkable material.

According to another aspect of the present invention, a method of fabricating a secondary battery includes providing an electrode assembly including a positive electrode plate, a negative electrode plate and a separator interposed between the two electrode plates, surrounding a circumferential surface of the electrode assembly with a sealing tape formed of a heat-shrinkable material, housing the electrode assembly, the sealing tape and an electrolyte solution in a can, electrically connecting the electrode assembly to the cap assembly, and sealing the can using the cap assembly, and heating the can at a predetermined temperature to shrink the sealing tape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
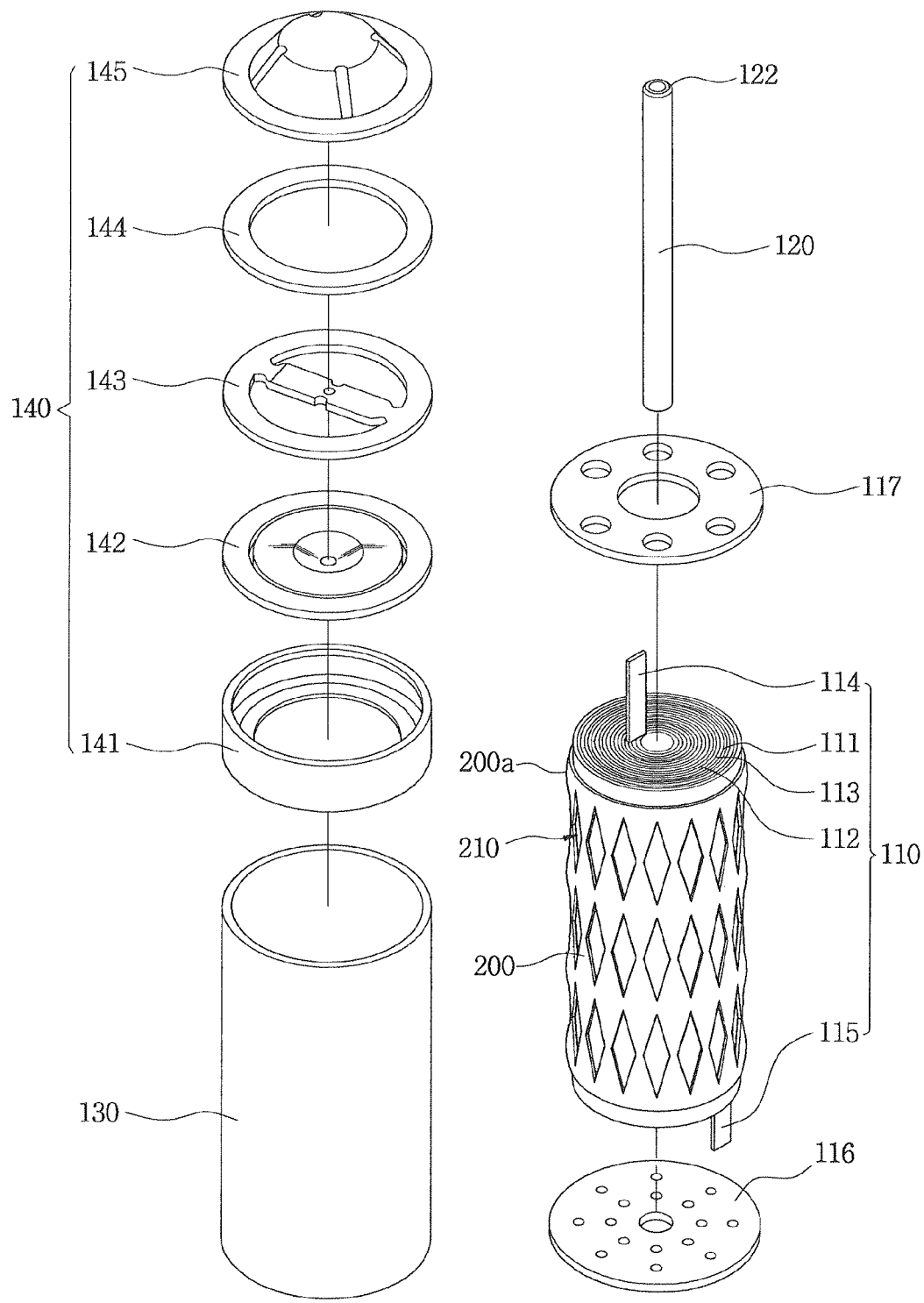
FIG. 1 is an exploded oblique view of a secondary battery constructed as an exemplary embodiment according to the principles of the present invention.

The above and other objects, features and functions of the present invention will be described more fully with reference to accompanying drawings. Moreover, in the drawings, the length and thickness of an element or a region may be exaggerated for clarity. Also, like numerals denote like elements throughout the specification. A part is "connected" with another part, which means that these are "directly connected", or "electrically connected" with each other having a third device therebetween.

Among different types of batteries, such as a nickel-cadmium (Ni—Cd) battery, a nickel-metal hydride (Ni-MH) battery, and a lithium (Li) battery, the lithium secondary battery is widely used for the handheld electronic/electrical devices due to an operating voltage three times higher and a higher energy density per unit weight than the Ni—Cd battery and the Ni-MH battery.

The lithium secondary battery can be classified into a lithium ion battery using a liquid electrolyte and a lithium polymer battery using a polymer electrolyte according to the kind of the electrolyte to be used. Also the lithium secondary battery can be classified into prismatic, cylindrical and pouch types according to the shape of the battery to be fabricated.

The secondary battery generally includes an electrode assembly, a can that houses an electrolyte to allow lithium ions to move in the electrode assembly, and a cap assembly that seals the can. Here, the cylindrical secondary battery includes a center pin having a predetermined length to prevent deformation of the electrode assembly during charge or discharge of the electrode assembly. The center pin includes a body disposed in the electrode assembly, and a hole that is disposed in the body in a length direction of the center pin to provide a passage for moving gases generated near the electrode assembly due to overcharge, exposure to high heat, and an internal error toward the cap assembly.

The electrode assembly includes a positive electrode plate having a positive electrode collector to which a positive electrode active material is applied and a positive electrode tab electrically connected to one side of the positive electrode collector, a negative electrode plate having a negative electrode collector to which a negative electrode active material is applied and a negative electrode tab electrically connected to one side of the negative electrode collector, and a separator disposed between the positive electrode plate and the negative electrode plate.

The electrolyte allows lithium ions generated by an electrochemical reaction to move between the positive and negative electrode plates of the electrode assembly during charge or discharge of the battery. The electrolyte may be a non-aqueous organic electrolyte solution which is a mixture of a lithium salt and a high-purity organic solvent, or a polymer using a polymer electrolyte.

To prevent heat generation, combustion and explosion of the secondary battery when an internal error such as damage to the electrode assembly due to overcharge, exposure to high heat, or an external impact occurs, the cap assembly includes a safety vent, which is deformed or broken due to the gas generated around the electrode assembly and moved through the center pin.

The secondary battery is designed such that an inner diameter of the can is a bit larger than an outer diameter of the electrode assembly to prevent the damage to the electrode assembly on housing the electrode assembly in the can. Therefore, the electrode assembly may be moved or May revolve due to an external impact such as the secondary battery being dropped, which leads to an electrical short circuit between the electrode assembly and the cap assembly.

Figure 2:
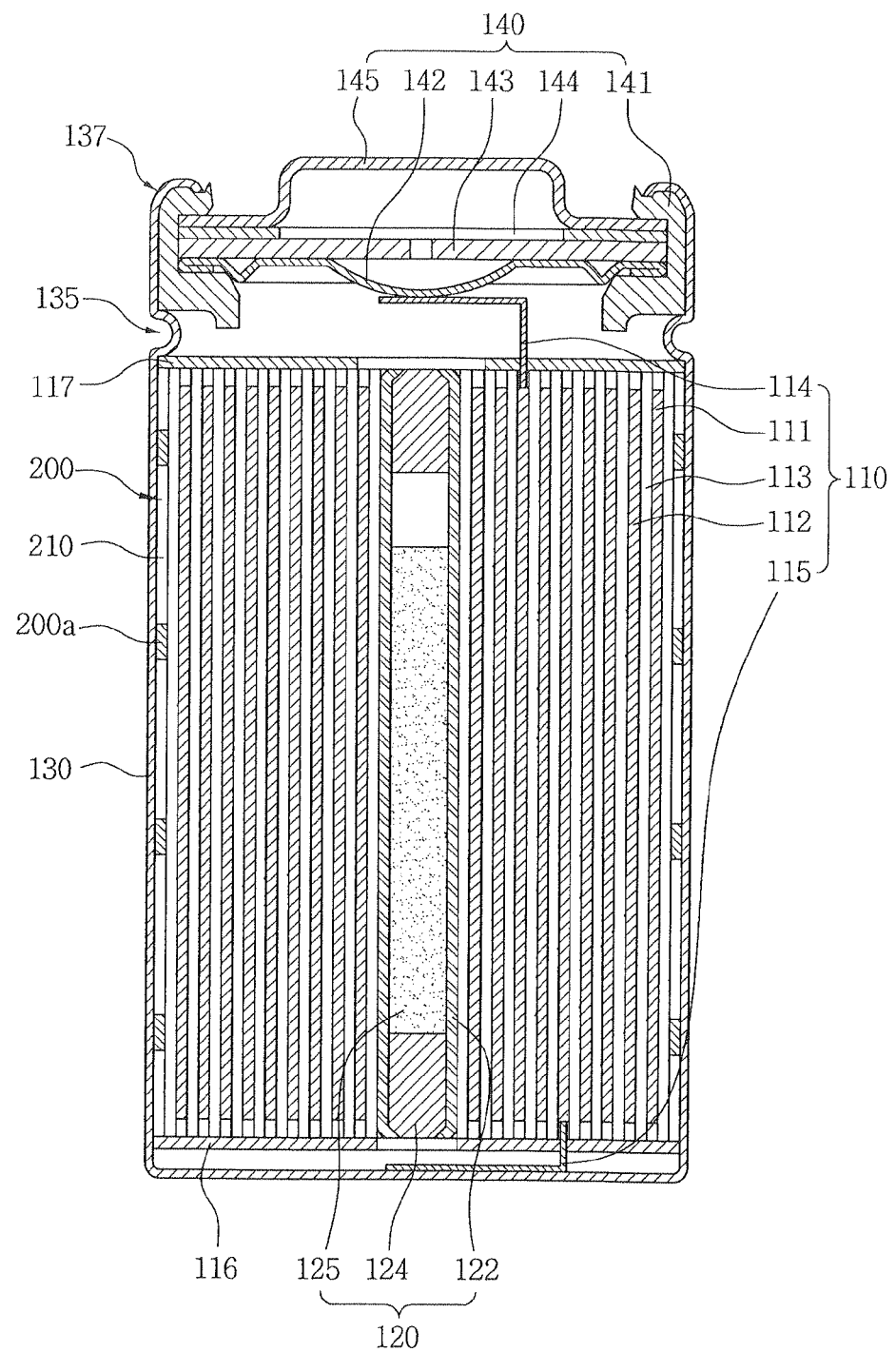
FIG. 2 is a cross-sectional view of a secondary battery constructed as an exemplary embodiment according to the principles of the present invention.
Figure 3:
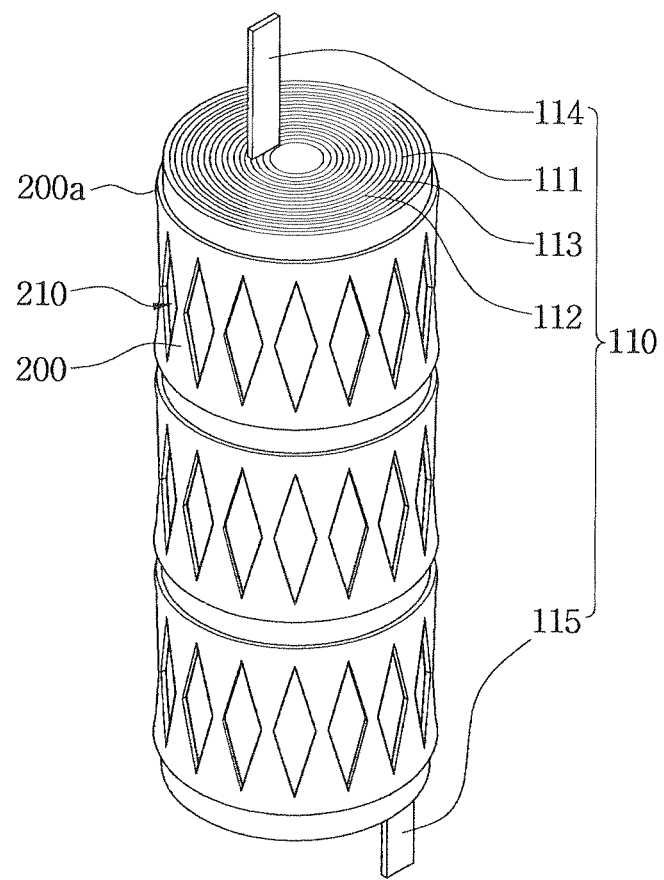
FIG. 3 is an oblique view of an example of an electrode assembly constructed as an exemplary embodiment according to the principles of the present invention.

FIG. 1 is an exploded perspective view of a secondary battery constructed as an exemplary embodiment according to the principles of the present invention, and FIG. 2 is a cross-sectional view of the secondary battery according to the exemplary embodiment of the principles of the present invention.

Referring to FIGS. 1 and 2, a secondary battery according to the exemplary embodiment of the present invention includes an electrode assembly 110, a center pin 120 disposed in electrode assembly 110, a can 130 housing electrode assembly 110, center pin 120, and an electrolyte (not shown), a sealing tape 200 disposed between electrode assembly 110 and can 130, and a cap assembly 140 sealing can 130.

Electrode assembly 110 includes a positive electrode plate 111, a negative electrode plate 112 and a separator 113 disposed between positive electrode plate 111 and negative electrode plate 112. Positive electrode plate 111 has a positive electrode collector (not shown) to which a positive electrode active material (not shown) is applied, and a positive electrode tab 114 electrically connected to one side of the positive electrode collector and projecting toward cap assembly 140. Negative electrode plate 112 has a negative electrode collector (not shown) to which a negative electrode active material (not shown) is applied, and a negative electrode tab 115 electrically connected to one side of the negative electrode collector and projecting in an opposite direction to positive electrode tab 114.

Here, in the exemplary embodiment of the present invention, positive electrode tab 114 of electrode assembly 110 is described as projecting toward cap assembly 140. Negative electrode tab 115 of electrode assembly 110 may, however, project toward cap assembly 140, and positive electrode tab 114 may project in the opposite direction to negative electrode tab 115.

The positive electrode active material may be a lithium-contained transition metal oxide or a lithium chalcogenide compound such as $LiCoO_2$, $LiNiO_2$, $LiMn_2O_4$ or $LiNi_{1-x-y}Co_xM_yO_2$ (herein, $0 \leq x \leq 1$, $0 \leq y \leq 1$, $0 \leq x+y \leq 1$, and M is a metal such as Al, Sr, Mg or La). The negative electrode active material may be a carbon material such as crystalline carbon, amorphous carbon, carbon complex or carbon fiber, lithium metal or a lithium alloy.

The positive electrode collector or negative electrode collector may be formed of one selected from the group consisting of stainless steel, nickel, copper, aluminum and an alloy thereof. Preferably, the positive electrode collector is formed of aluminum or an aluminum alloy, and the negative electrode collector is formed of copper or a copper alloy to maximize efficiency of electrode assembly 110.

Separator 113 is interposed between positive electrode plate 111 and negative electrode plate 112 to prevent an electrical short circuit therebetween and allows movement of lithium ions between the two electrode plates. Separator 113 may be formed of a polyolefin-based copolymer layer, for example, formed of polyethylene (PE) or polypropylene (PP), or in a multilayer structure thereof. Separator 113 may also be formed of a porous layer including a ceramic material, or a combination of the polyolefin-based polymer layer and the porous layer including a ceramic material.

Here, the ceramic material may be one selected from the group consisting of silica ($SiO_2$), alumina ($Al_2O_3$), zirconium oxide ($ZrO_2$), titanium oxide ($TiO_2$), and insulating nitrides, hydroxides, alkoxides and ketones thereof.

The electrolyte solution facilitates movement of lithium ions generated by an electrochemical reaction between positive electrode plate 111 and negative electrode plate 112 of electrode assembly 110 during charge or discharge of the battery. The electrolyte solution may be a non-aqueous organic electrolyte solution such as a mixture of a lithium salt and a high purity organic solvent, or a polymer using a polymer electrolyte.

Center pin 120 is disposed in electrode assembly 110 to prevent deformation of electrode assembly 110 during the charge or discharge of the battery, and to provide a passage for moving gas generated around electrode assembly 110 due to overcharge, exposure to high heat, or an internal error caused by external impact toward cap assembly 140. Center pin 120 may include a body 122 having a predetermined length, and may further include a sealing member 124 sealing an inner space of body 122 and an extinguishing member 125 inserted into the sealed space of body 122.

Body 122 may be formed to a predetermined length in a thickness direction of electrode assembly 110. Body 122 may have a through hole therein in a lengthwise direction of body 122, which serves as a passage for the gas generated near electrode assembly 110. Body 122 may be formed of an insulating material such as polybutylene terephthalate (PBT), or a metallic material such as steel, stainless steel, aluminum or an aluminum alloy to easily move the gas in a high temperature condition such as overcharge or exposure to high heat.

Sealing member 124 may be melted or broken when the internal error occurs, in order to allow body 122 of center pin 120 to serve as the passage for the gas generated near electrode assembly 110, and to insert the extinguishing member 125 which is inserted into body 122 into electrode assembly 110. Sealing member 124 may be formed of a polymer resin such as polyethylene (PE), polypropylene (PP), or polyethyleneterephthalate (PBT), which is melted or broken at high temperature. In consideration of a temperature at which the internal error generally occurs in the secondary battery, sealing member 124 may be melted or broken at 100 to 130° C.

Can 130 may be formed in a cylindrical shape having a predetermined radius, a top opening and a circular bottom to house electrode assembly 110, center pin 120 and the electrolyte solution. Can 130 may be formed of a metallic material which is lightweight and flexible, such as aluminum, an aluminum alloy or stainless steel. Accordingly, when negative electrode tab 115 projecting in the opposite direction to positive electrode tab 114 is electrically connected to the bottom of can 130, can 130 may serve as a negative electrode terminal.

Can 130 may include a beading part 135 and a crimping part 137. Beading part 135 is formed by inwardly projecting a circumferential surface of can 130 between cap assembly 140 and electrode assembly 110 by a predetermined distance.

Crimping part 137 is formed by inwardly bending an upper end of can 130 based on cap assembly 140. Can 130 formed with beading part 135 and a crimping part 137 prevents separation of cap assembly 140 from can 130, and prevents vertical movement of electrode assembly 110 due to an external force after being sealed using cap assembly 140.

To prevent an unnecessary electrical connection between electrode assembly 110 and cap assembly 140, and between electrode assembly 110 and can 130, an upper insulating plate 117 may be disposed on electrode assembly 110 and having one or more holes through which the gas generated around electrode assembly 110 may be moved, and a lower insulating plate 116 may be disposed under electrode assembly 110.

Cap assembly 140 may include a cap-up 145, a safety vent 142, a current interrupt device (CID) 143, and a gasket 141. Cap-up 145 is electrically connected to an external terminal (not shown) and coupled to the top opening of can 130 to seal can 130. Safety vent 142 is electrically connected to positive electrode tab 114 of electrode assembly 110 and is deformed or broken when an inner pressure exceeds a predetermined level due to the gas generated around electrode assembly 110 to exhaust the gas. Current interrupt device (CID) 143 is formed on safety vent 142 to block an electrical connection between electrode assembly 110 and the external terminal by being damaged or broken as safety vent 142 is deformed or broken due to the inner pressure. Gasket 141 insulating cap assembly 140 from can 130.

Here, cap assembly 140 may further include a ring-shaped positive temperature coefficient (PTC) thermistor 144 disposed between CID 143 and cap-up 145 to prevent overcurrent generated between electrode assembly 110 and an external terminal.

Sealing tape 200 is to prevent unwinding of the electrode assembly wound in a circular shape before being inserted into can 130. Sealing tape 200 is disposed to surround a circumferential surface of electrode assembly 110 wound in the circular shape. Sealing tape 200 is formed of a heat-shrinkable material which is shrunken at a predetermined temperature, thereby increasing a total thickness of sealing tape 200. For example, sealing tape 200 may be formed of polyethylene terephthalate (PET), polytrimethylene terephthalate (PTT), or a mixture thereof. Here, an end of sealing tape 200 is adhered to the outermost end of the wound electrode assembly 110, thereby easily preventing unwinding of electrode assembly 110.

In the exemplary embodiment of the present invention, sealing tape 200 is described as directly surrounding a circumferential surface of electrode assembly 110. There may, however, be disposed at least one of some tape or film (not shown) between sealing tape 200 and the electrode assembly 110. In this case, the end of sealing tape 200 is adhered to the outermost end of the wound electrode assembly 110 through at least one protecting tape.

Figure 4:
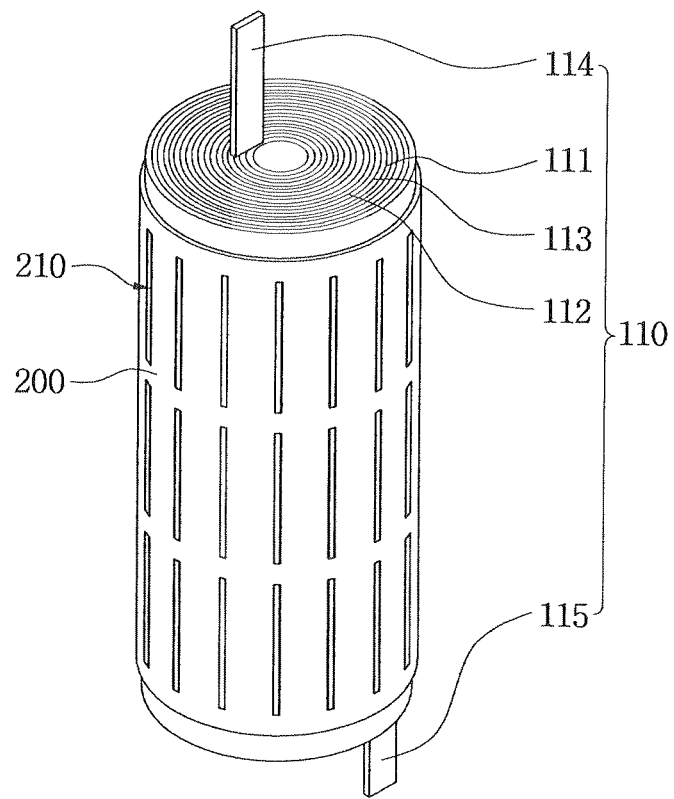
FIG. 4 is an oblique view of the shape of the electrode assembly prior to heat shrinkage according to an exemplary embodiment of the principles of the present invention.

FIG. 4 is a perspective view of the shape of the electrode assembly including the sealing tape prior to heat shrinkage according to an exemplary embodiment of the present invention. As shown in FIG. 4, sealing tape 200 may include a plurality of trenches or grooves 210 having predetermined lengths along a width direction of sealing tape 200 in a predetermined region. The width direction of sealing tape 200 refers to an axial direction when the electrode assembly is wound. The heat shrinkage of sealing tape 200 takes place around trenches or grooves 210 at a predetermined temperature, thereby increasing a thickness of a region 200a between trenches or grooves 210 due to the heat shrinkage. That is, when finished tape 200 is heated to the predetermined temperature, sealing tape 200 shrink such that trenches or grooves 210 become polygons or diamonds as shown in FIG. 1. Here, when sealing tape 200 is shrunken in the width direction, the separator of electrode assembly 110 may also be shrunken. Accordingly, trench or groove 210 may be formed to a predetermined length in the width direction to allow sealing tape 200 to be shrunken in a direction in which electrode assembly 110 is wound.

Sealing tape 200 may include several sub-sealing tapes (not shown) to prevent the shrinkage of separator 113 at the same time that sealing tape 200 is shrunken.

A method of fabricating a secondary battery according to an exemplary embodiment of the present invention includes providing an electrode assembly 110 including a positive electrode plate 111, a negative electrode plate 112 and a separator 113 disposed between the two electrode plates, surrounding a circumferential surface of electrode assembly 110 with a sealing tape 200 formed of a heat-shrinkable material, and housing electrode assembly 110 and sealing tape 200 in a can 130. Here, sealing tape 200, as shown in FIG. 4, may include a plurality of trenches or grooves 210 having predetermined lengths to control a region 200a increasing in thickness due to heat shrinkage.

In the exemplary embodiment of the present invention, the method of fabricating is described as surrounding the circumferential surface of electrode assembly 110 with a sealing tape 200. However, the method of fabricating includes surrounding the circumferential surface of electrode assembly 110 with at least one of some tape or film (not shown), and surrounding at least one of some tape or film with the sealing tape 200.

Subsequently, can 130 is filled with an electrolyte solution. A positive electrode tab 114 of electrode assembly 110 is electrically connected to a safety vent 142 of a cap assembly 140. Then, can 130 is sealed using cap assembly 140.

Afterwards, sealing tape 200 is shrunken by heating the periphery of can 130 at a predetermined temperature, and thus electrode assembly 110 is close to can 130. Here, since the heat shrinkage of sealing tape 200 progresses around trenches or grooves 210, after the heat shrinkage is completed, sealing tape 200 increases in thickness in region 200a between trenches or grooves 210. As a result, electrode assembly 110 surrounded by sealing tape 200 is close to can 130 in position. Trenches or grooves 210 may be transformed to a polygonal, particularly, a diamond, shape due to the heat shrinkage.

The predetermined temperature may be about 90° C. or less, and preferably, about 40° C. to 60° C. to prevent denaturation of the electrolyte solution housed in can 130 or damage to the electrode assembly.

When sealing tape 200 is shrunken by less than 50%, electrode assembly 110 may not be sufficiently close to can 130. When sealing tape 200 is shrunken by 70% or more, separator 113 of electrode assembly 110 may also be shrunken. Thus, sealing tape 200 may be formed of a heat-shrinkable material which is shrunken 50 to 70%, and preferably, a heat-shrinkable material which is shrunken 50 to 70% at about 40° C. to 60° C. to prevent damage to the secondary battery as described above.

In the exemplary embodiment of the present invention, the secondary battery having a center pin, which is disposed in the electrode assembly wound in a cylindrical shape, and the can formed in a cylindrical type have been described. However, a prismatic or pouch-type secondary battery also has an electrical short circuit between an electrode assembly and a cap assembly when the electrode assembly is moved or revolves due to an external impact such as being dropped.

Thus, a sealing tape is formed of a heat-shrinkable material as described herein, and thus the can may be close to the electrode assembly.

Consequently, in the secondary battery according to the exemplary embodiment of the present invention, the sealing tape surrounding the circumferential surface of the electrode assembly is formed of a heat-shrinkable material to seal the can by heating the can at a predetermined temperature, resulting in shrinkage of the sealing tape. Thus, the electrode assembly is close to the can, thereby preventing movement or revolution of the electrode assembly due to the external impact such as being dropped.

According to the present invention, in a secondary battery, after a sealing tape surrounding a circumferential surface of an electrode assembly is formed of a heat-shrinkable material, and a can is sealed using a cap assembly, the can is heated at a predetermined temperature to thicken a partial region of the sealing tape due to heat shrinkage. Thus, an electrical short circuit between the electrode assembly and the cap assembly due to an external impact such as being dropped can be prevented.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A secondary battery, comprising:
   an electrode assembly including a positive electrode plate, a negative electrode plate, and a separator interposed therebetween;
   a sealing tape surrounding a circumferential surface of the electrode assembly;
   a can housing the electrode assembly;
   a cap assembly sealing the can; and
   at least one protecting tape disposed between the sealing tape and the electrode assembly,
   the sealing tape being formed of a heat-shrinkable material.

2. The secondary battery according to claim 1, wherein the sealing tape is a material which is shrunken 50 to 70% at about 40° C. to 60° C.

3. The secondary battery according to claim 1, wherein the sealing tape comprises a plurality of polygonal holes formed in a region increasing in thickness of sealing tape due to heat shrinkage.

4. The secondary battery according to claim 3, wherein the polygonal holes are formed in diamond shapes.

5. The secondary battery according to claim 3, wherein before the heat shrinkage, the sealing tape comprises a plurality of trenches formed in a predetermined length along a width direction of the sealing tape, and said plurality of trenches transform into the polygonal holes after the heat shrinkage.

6. The secondary battery according to claim 1, wherein one end of the sealing tape is adhered to a circumferential surface in which the outermost end of the electrode assembly is disposed.

7. The secondary battery according to claim 1, wherein the electrode assembly comprises a center pin disposed therein.

8. The secondary battery according to claim 1, wherein the sealing tape comprises a plurality of sub-sealing tapes surrounding the circumferential surface of the electrode assembly.

9. The secondary battery according to claim 1, wherein a thickness of at least one region of the sealing tape increases due to heat shrinkage of the sealing tape.

10. A method of fabricating a secondary battery, comprising:
    providing an electrode assembly including a positive electrode plate, a negative electrode plate and a separator interposed between the two electrode plates;
    surrounding a circumferential surface of the electrode assembly with a sealing tape formed of a heat-shrinkable material;
    housing the electrode assembly, the sealing tape and an electrolyte solution in a can;
    electrically connecting the electrode assembly to the cap assembly, and sealing the can using the cap assembly;
    heating the can at a predetermined temperature to shrink the sealing tape; and
    forming a plurality of trenches or grooves in a predetermined region of the sealing tape before the can is heated to allow heat shrinkage of the sealing tape to progress around the trenches or grooves.

11. The method according to claim 10, wherein the predetermined temperature is in the range of 40° C. to 60° C.

12. The method according to claim 10, wherein the sealing tape is formed of a material which is shrunken 50 to 70% at about 40° C. to 60° C.

13. The method according to claim 10, wherein one end of the sealing tape is adhered to the outermost end of the electrode assembly, and the electrode assembly is surrounded by the sealing tape.

14. The method according to claim 10, wherein the trenches or grooves are formed to have a predetermined length in a width direction of the sealing tape.

15. The method according to claim 10, wherein the sealing tape includes a plurality of sub-sealing tapes surrounding a circumferential surface of the electrode assembly.

16. The method according to claim 10, wherein the electrode assembly includes a center pin disposed therein.

* * * * *